(12) United States Patent
Huang et al.

(10) Patent No.: US 10,997,680 B1
(45) Date of Patent: May 4, 2021

(54) NETWORK DESIGN AND OPTIMIZATION

(71) Applicant: Anthem, Inc., Indianapolis, IN (US)

(72) Inventors: KuoLing Huang, Chicago, IL (US); Yue Geng, Chicago, IL (US); Yan Jiang, Wilmette, IL (US); Adarsh Ramesh, Schaumburg, IL (US); Changhyeok Lee, Santa Clara, CA (US); Ariel Bayewitz, Teaneck, NJ (US); Shawn Wang, Kildeer, IL (US)

(73) Assignee: Anthem, Inc., Indianapolis, IN (US)

( * ) Notice: Subject to any disclaimer, the term of this patent is extended or adjusted under 35 U.S.C. 154(b) by 42 days.

(21) Appl. No.: 16/584,292

(22) Filed: Sep. 26, 2019

Related U.S. Application Data

(63) Continuation of application No. 16/442,947, filed on Jun. 17, 2019.

(60) Provisional application No. 62/835,286, filed on Apr. 17, 2019.

(51) Int. Cl.
*G06F 17/12* (2006.01)
*G06Q 50/22* (2018.01)

(52) U.S. Cl.
CPC ............. *G06Q 50/22* (2013.01); *G06F 17/12* (2013.01)

(58) Field of Classification Search
CPC ................................ G16H 80/00; G06F 17/12
See application file for complete search history.

(56) References Cited

U.S. PATENT DOCUMENTS

| | | | |
|---|---|---|---|
| 2003/0033196 A1* | 2/2003 | Tomlin | G06Q 30/02 705/14.52 |
| 2014/0114674 A1* | 4/2014 | Krughoff | G06Q 30/0629 705/2 |
| 2019/0043606 A1* | 2/2019 | Roots | G16H 50/70 |

* cited by examiner

*Primary Examiner* — Sheetal R Paulson
(74) *Attorney, Agent, or Firm* — Morgan, Lewis & Bockius, LLP (57) ABSTRACT

A computer-implemented method for selecting one or more providers having one or more specialties for a network available to members while satisfying one or more constraints, the method comprising: at a first computing device: receiving, from a second computing device separate and distinct from the first computer, a network provider request to select an optimized network of providers, the request including: a desired objective including at least one of provider cost minimization, provider average quality maximization and provider total volume maximization, one or more geographical designations, computing an optimized provider network of one or more selected providers including: applying a model that produces a non-optimized provider network of one or more providers having one or more specialties that satisfies the desired objective for the one or more geographical designations of the members without consideration of the availability in the geographical designation of one or more providers having one or more specialties, and applying a linear decomposition to the pre-optimized provider network to generate an optimized provider network; providing the optimized provider network to the second computing device.

9 Claims, 6 Drawing Sheets

Algorithm 1 *Integer L-shaped method for solving model (23)*

Input: A optimality gap $\epsilon_{gap}$.
Output: An optimal solution to the problem.
1: Set $k = 0$, $UB = \infty$, $gap = \infty$.
2: Add root not problem to tree $T$
   {Branch-and-cut phase}
3: while $|T| \neq \emptyset$ do
4:     Select a node from $T$, and solve master problem (23).
5:     if Master problem is infeasible then
6:         Fathom the current node and goto step 3.
7:     end if
8:     Let $z_{LP}^k$ be the current optimal objective value, and let $\tilde{y}^k$ be corresponding the optimal solution.
9:     if $z_{LP}^k > UB$ then
10:        Fathom the current node and goto step 3.
11:    end if
12:    if $\tilde{y}^k$ is fractional then
13:        Create branches add the new nodes to $T$ and goto step 3.
14:    end if
15:    for $s \in S$ do
16:        if $Q_s(\tilde{y}^k)$ is not feasible then
17:            Generate a feasibility cut using Theorem 2.2 and append it to master problem (23).
18:            Goto step 3.
19:        end if
20:    end for
21:    Set $UB = \min\{UB, \tilde{c}^T \tilde{y}^k\}$.
22:    Set $k = k + 1$.
23: end while

| Requirement | Possible Values | Selection Criteria |
|---|---|---|
| State | CO, CT, GA, IN, ME, NH, NV, NY, VA | Randomly selected |
| Product | Commercial | NA |
| LOB | PPO, HMO | Randomly selected |
| Specialty | 23 most commonly used specialties* | All selected |

*: Ophthalmology, General Surgery, Orthopedic Surgery, Cardiology, Dermatology, Neurology, Gastroenterology, Otolaryngology, Urology, Chiropractic, Endocrinology, Family Practice, General Practice, Internal Medicine, Interventional Cardiology, Licensed Clinical Social Wrkr, Nephrology, Neurosurgery, Pediatric Medicine, Physical Medicine and Rehab, Podiatry, Pulmonary Disease.

Table 1: Problem Profile

NETWORK DESIGN AND OPTIMIZATION

CROSS-REFERENCE TO RELATED APPLICATIONS

This application is a continuation of U.S. patent application Ser. No. 16/442,947, filed on Jun. 17, 2019, which claims the benefit of U.S. Provisional Patent Application No. 62/835,286 filed on Apr. 17, 2019 entitled "NETWORK DESIGN AND OPTIMIZATION", which is incorporated by reference in its entirety.

BACKGROUND

This application may provide details of a Network Design and Optimization (NDO) project. The purpose of an NDO may be to create an online solution platform that may help business clients construct an effective healthcare provider network solution. The NDO may be required to meet specific business requirements such as product scope, specialty required, minimum retained volume, network coverage ratio and cost/quality baseline. More importantly, it may be cost-effective and the solution time may be limited to 10 minutes. To address these challenging business requirements, a fractional mixed-integer linear optimization model, accompanying with several computational enhancements that speedup the solution time without compromising the solution quality as a bid may be presented herein. Computational results on 396 problems drawn from different product scopes using real life data may show that the proposed solution needs only 35 seconds of computations on average to find the optimal solution. The solution described herein may improve the cost-saving target by 16% on average, when compared with a current baseline solution.

Depending on the product scope and other business requirements, the created optimization model may involve 100,000 binary decision variables and model constraints, which undoubtedly complicates the model complexity. In our computational experience, leading commercial optimization software packages such as Gurobi may require an hour of computations to obtain the optimized network solution. Unfortunately, such excessive solution time must be prohibited, as the purpose of NDO is to provide a network solution in a real-time manner (typically within a 10-minute time limit) In lieu of this obstacle, additional computational techniques that successfully speed up the solution process without compromising the solution quality as a bid may be presented herein.

The invention is to create an online solution platform for business users to create a customized healthcare provider network solution that satisfies the business requirements such as product scope, specialty required, minimum retained volume, network coverage ratio and cost/quality baseline. At the core of the solution is an optimization model that is enhanced with our in-house computational innovations to speed up the solution process. Computational results on a large number of problems drawn from different product scopes using real life data clearly demonstrate the efficiency and effectiveness of our solution approach.

SUMMARY

In one embodiment there is a computer-implemented method for selecting one or more providers having one or more specialties for a network available to members while satisfying one or more constraints, the method comprising: at a first computing device: receiving, from a second computing device separate and distinct from the first computer, a network provider request to select an optimized network of providers, the request including: a desired objective including at least one of provider cost minimization, provider average quality maximization and provider total volume maximization, one or more geographical designations, computing an optimized provider network of one or more selected providers including: applying a model that produces a non-optimized provider network of one or more providers having one or more specialties that satisfies the desired objective for the one or more geographical designations of the members without consideration of the availability in the geographical designation of one or more providers having one or more specialties, and applying a linear decomposition to the pre-optimized provider network to generate an optimized provider network; providing the optimized provider network to the second computing device.

In one embodiment, wherein without consideration of the availability in the geographical designation of one or more providers having one or more specialties includes forgoing considering whether a ratio of total members in a particular geographical designation have access to a particular specialty is greater than a member coverage ratio threshold.

In one embodiment, wherein without consideration of the availability in the geographical designation of one or more providers having one or more specialties includes forgoing considering whether a single member in each of the geographical designations will have access to each of the particular specialties.

In one embodiment, wherein without consideration of the availability in the geographical designation of one or more providers having one or more specialties includes for each particular geographical designation, each particular provider and/or each particular provider specialty, forgoing considering whether all members in the particular geographical designation have access to the particular provider specialty offered by the particular provider;

In one embodiment, the average cost of the selected providers is less than a predetermined provider cost threshold.

In one embodiment, the average volume of the selected providers is greater than a predetermined provider volume threshold.

In one embodiment, the average quality of the selected providers is greater than a predetermined provider quality threshold.

In one embodiment, the linear decomposition is bender's decomposition.

In one embodiment, one or more memory units each operable to store at least one program; and at least one processor communicatively coupled to the one or more memory units, in which the at least one program, when executed by the at least one processor, causes the at least one processor to perform the steps specified above.

BRIEF DESCRIPTION OF THE SEVERAL VIEWS OF THE DRAWINGS

The foregoing summary, as well as the following detailed description of aspects of the disclosed invention, will be better understood when read in conjunction with the appended drawings of an exemplary aspect. It should be understood, however, that the invention is not limited to the precise arrangements and instrumentalities shown. In the drawings:

FIG. 3 is an exemplary illustration of an algorithm according to at least one aspect of the present invention;

DETAILED DESCRIPTION

In some aspects, methods and systems described herein provide the technical details for a Network Design and Optimization (NDO) project. The purpose of NDO may be to provide an online solution platform that may help business clients create a cost and quality effective healthcare provider network in a real time manner Included in this network are a set of providers that not only meet the business requirements such as product scope, specialty required, minimum retained volume, network coverage ratio, cost/quality baseline; more importantly, they have to be cost-effective. As such, an optimization model as described herein was developed to, among other things, solve this specific provider selection problem.

The disclosure described herein may describe:
1. An optimization model in Section 1.1 for NDO.
2. How this model may improve the cost-saving by 16% on average as shown in Section 2.1.
3. It may be shown in Section 1.4 that the proposed optimization model may have a special dual block-angular structure, for which the integrality requirements and some constraints associated with each block may be eliminated safely. Benders decomposition may be applied for solving this dual block-angular structure problem. In one embodiment, it may be shown that each sub problem can be solved in closed-form to generate the Benders cuts. This may further simplify the model complexity and thus potentially improve the solution time. These enhancements may speed up the solution time by almost 14 folds.

Solution time and solution quality may be equally important since, as described herein, one of the goals of the system may be to deliver an effective provider network solution efficiently.

Figure 1:
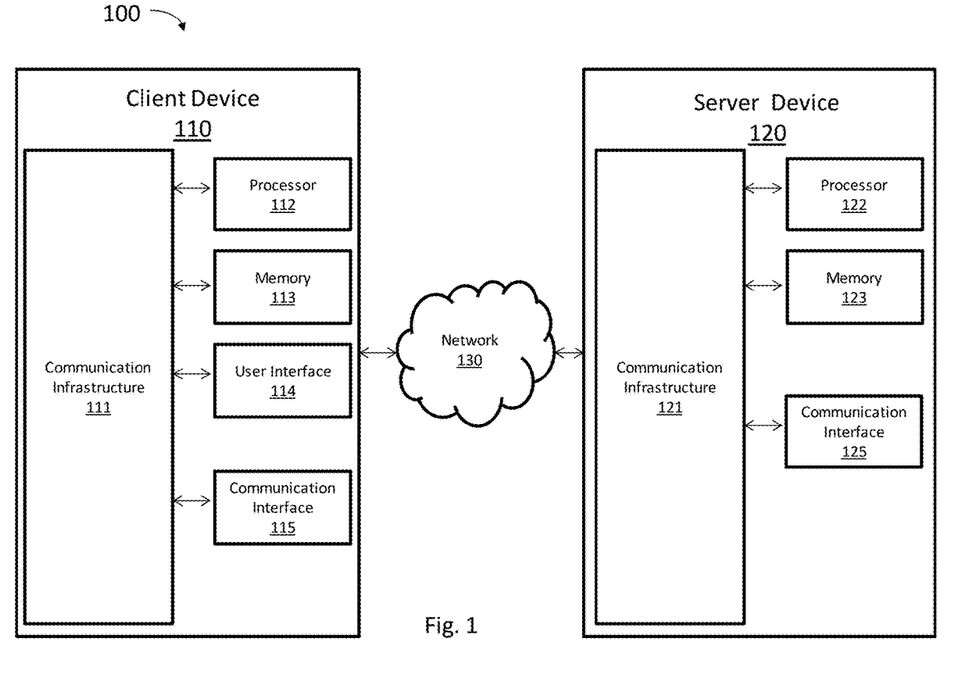
FIG. 1 illustrates a block diagram that illustrates an example system optimizing network design according to at least one aspect of the present invention.

FIG. 1 shows a block diagram that illustrates a system 100 for improving personalized provider search according to at least one aspect of the present invention. While some example features are illustrated, various other features have not been illustrated for the sake of brevity and so as not to obscure pertinent aspects of the example aspects disclosed herein. To that end, in at least one aspect, the system 100 may include one or more computers or servers, non-transitory memory operable to store one or more computer programs and one or more processors to implement the one or more computer programs. For example, the system 100, shown in FIG. 1, may include client device 110, server device 120 and network 130.

Client device 110 may be a computing device for receiving inputs from a user (e.g., a member), requesting data from server device 120 via network 130 and/or displaying data from service device 120 at the request of a user. Examples of a client device 110 may include a smart phone, tablet or a personal computer, among others.

Server device 120 may be any computing device, including one or more software modules (e.g., a scoring module) for receiving and/or responding to requests for data from client device 110. Examples of data may include web page data, hypertext markup language (HTML), text, video, audio as a free form speech describing symptoms and conditions, picture, software, executable, interpretable, byte-code, and binary files. In some aspects, the server device 120 may be a plurality of computing devices that process the request from the client device 110. The server device 120 may be configured to process requests from other computing devices in parallel with the request from the client device 110.

In one aspect, server device 120 is a web server that hosts a website. Client device 110 may be configured to request provider recommendations from server device 120 based on a hypertext transfer protocol (HTTP). Server device 120 may respond to a provider recommendation request by sending provider recommendation data (e.g., an ordered list of providers) to client device 110. In one aspect, provider recommendation data may include web page data included on an HTML web page. While the server device 120 may be configured for HTTP/HTML requests and responses, as described in the exemplary aspect above, the system 100 is not limited to the use of HTML or HTTP, and that aspects of the present invention can be used with any computer communication language or network protocol suitable for the purposes of the described communications between client device 110 and server device 120.

Client device 110 may include communication infrastructure 111, processor 112, memory 113, user interface 114 and communication interface 115. Server device 120 may include communication infrastructure 121, processor 122, memory 123 and communication interface 125.

Processor 112 or processor 122 may be any type of processor, including but not limited to a special purpose digital signal processor. Processor 112 is connected to a communication infrastructure 111 (for example, a bus or network). Processor 112 is connected to a communication infrastructure 121 (for example, a bus or network). Various software implementations are described in terms of this exemplary computer system.

Memory 113 or memory 123 may include one or more of: random access memory (RAM), a hard disk drive and a removable storage drive, such as a floppy disk drive, a magnetic tape drive, or an optical disk drive, etc. The removable storage drive may read from and/or writes to a removable storage unit. The removable storage unit can be a floppy disk, a magnetic tape, an optical disk, etc., which is read by and written to a removable storage drive. Memory 113 and/or memory 123 may include a computer usable storage medium having stored therein computer software programs and/or data to perform any of the computing functions of client device 110 and/or server 120. Computer software programs (also called computer control logic), when executed, enable client device 110 and/or server 120 to implement aspects of the present invention as discussed herein. Accordingly, such computer software programs represent controllers of client device 110 and/or server 120.

Memory 123 may include one or more data stores that store data such as web page data, software files or any other types of data files. Server device 120 may retrieve the data from memory 123 before transmitting to client device 110 via network 130. Memory 123 may include member characteristics, provider characteristics, member-provider interaction characteristics, feature bias weightings, member/provider bias weightings, and learnt weightings, among other described herein.

User interface 114 may be produced by a program that controls a display (not shown) of client device 110. User interface 114 may include one or more peripheral user interface components, such as a keyboard or a mouse. The user may use the peripheral user interface components to interact with client device 110. User interface 114 may receive user inputs, such as mouse inputs or keyboard inputs from the mouse or keyboard user interface components. User interface 114 may display data, such as web pages, on the display of client device 110 using a web browser. While the user interface 114 may be configured for displaying data using a web browser, as described in the exemplary aspect above, user interface 114 is not limited to displaying data using a web browser, and that aspects of the present invention may contemplate using other display devices or software suitable for the purposes of the displaying the data.

Communication interface 115 and/or communication interface 125 allow data to be transferred between client device 110 and server device 120 via network 130. Examples of communication interface 115 or communication interface 125 may include a modem, a network interface (such as an Ethernet card), a communication port, a Personal Computer Memory Card International Association (PCM-CIA) slot and card, etc. Data transferred via communication interface 115 or communication interface 125 are in the form of signals, which may be electronic, electromagnetic, optical, or other signals capable of being transmitted or received by communication interface.

Network 130 connects client device 110 and server device 120 by carrying signals. Network 130 may be implemented using wire or cable, fiber optics, a phone line, a wireless link, a cellular phone link, a radio frequency link, or any other suitable communication channel. For instance, network 130 may be implemented using a combination of channels. Network 130 may be implemented as an intranet and/or an internet.

Figure 2:
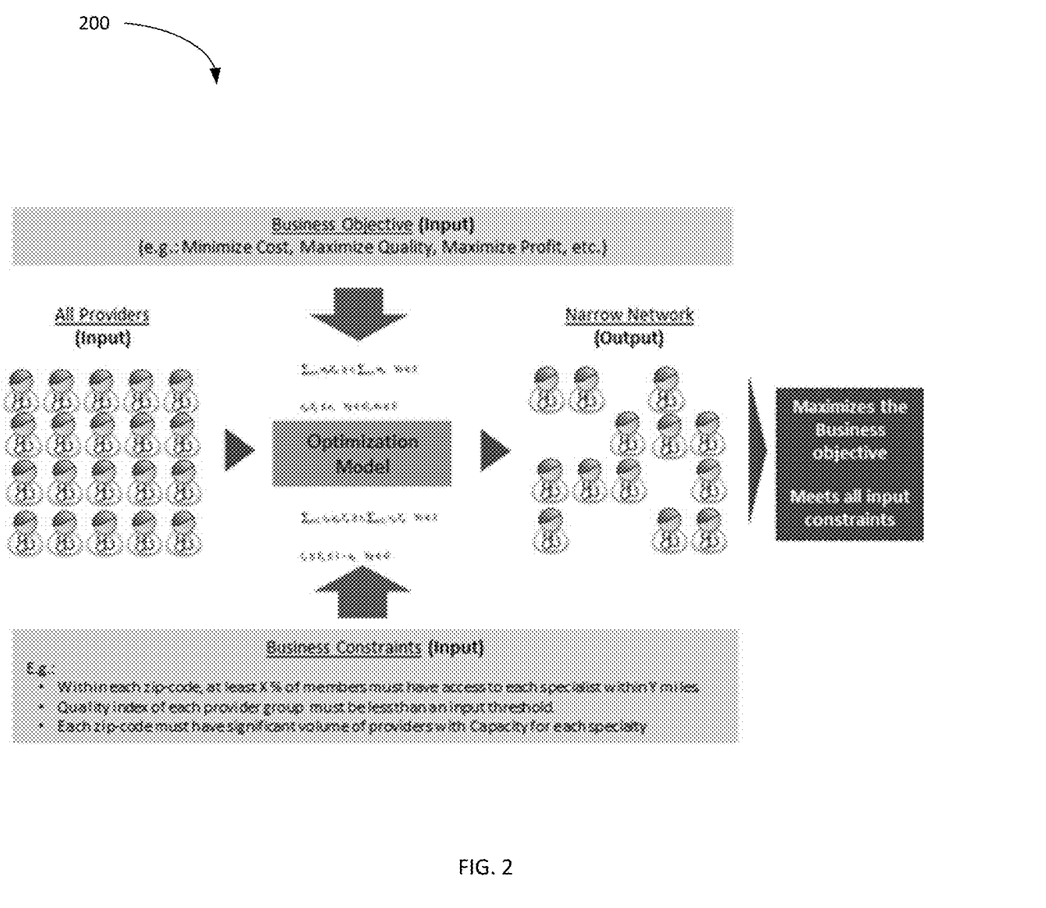
FIG. 2 is an exemplary illustration of a business objective and optimization according to at least one aspect of the present invention.
Figure 4:
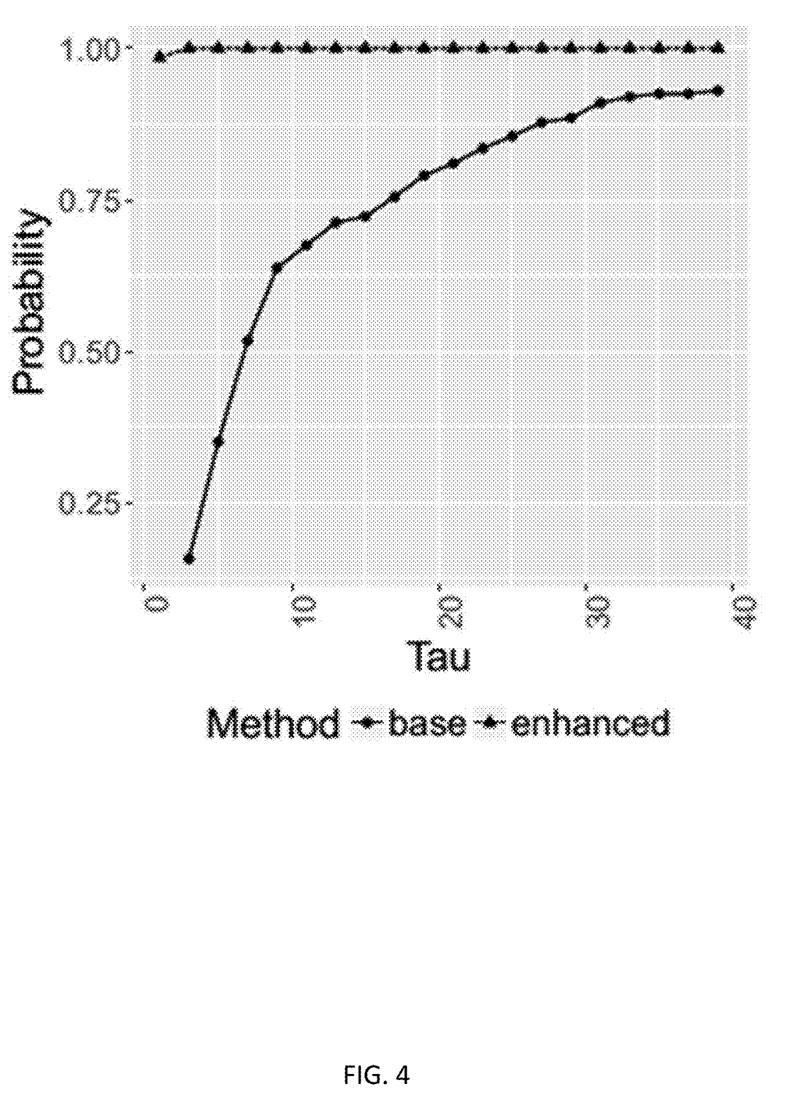
FIG. 4 is an exemplary illustration of a graph of performance profiles comparing solution time performances of the basic model and the enhanced model according to at least one aspect of the present invention.

Referring to FIG. 2, there is shown the business objective 200 in accordance with an exemplary embodiment of the present invention.

A method of implementing the optimization model, as described herein, may be:

Step 1. User inputs requirements through solution platform webpage.

Step 2. Upon completion, user submits the problem to backend computation engine.

Step 3. Backend computation engine performs the computations and returns the results.

Step 4. If a valid network solution is available, solution platform reports the network solution performance, as well as sensitivity analysis around the current solution.

Step 5. If a valid network solution is not available, solution platform reports the root-cause that results in the model infeasibility.

Step 6. Users fix the input based on the infeasibility report and resubmit the problem.

Further, as described herein, an optimization engine has been developed that systematically and automatically creates a cost and quality effective healthcare provider network in a real time manner Included into this network may be a set of providers that not only meet the business requirements such as product scope, specialty required, minimum retained volume, network coverage ratio, cost/quality baseline; more importantly, they have to be cost-effective.

Our model equipped with our in house enhancements allows optimization software package to explore astronomical number of possibilities (trillion number of solutions is very common in optimization) and find out the best one in minutes, if not seconds. Without optimization, such network solutions must be created manually and the solution optimality cannot be guaranteed.

Our online platform solution provides a very clean interactive user interface, which helps business users input the model parameters and create the network solution without the need of any technical background. Furthermore, it provides additional diagnostics that help users to construct valid network solutions easily, as well as other post-analysis tools for users to profile the details of the constructed solution clearly.

Healthcare insurance companies might likely use this invention when they try to construct an optimized healthcare provider network.

I. Network Design and Optimization

Details of the proposed optimization model for NDO are presented herein. The basic model formulation will be described. It is then shown that the model has an equivalent but simplified format with improved model complexity. Finally, Benders decomposition on this enhanced model is applied, and further shown that each decomposed subproblem may be solved in closed-form.

1.1 Notation Set

S: A set of specialties.

$S_g \subset S$: A set of specialties with geo-access requirements.

G: A set of provider groups.

$G_c \subset G$: A set of provider groups with scorable cost index.

$G_q \subset G$: A set of provider groups with scorable quality index.

Z: A set of member zip codes.

Sets Related to Manual Override

Gρ: A set of providers with PCP.

$G_S$: A set of providers with multi-specialty.

$G_I$: A set of providers that must be included into the network. Users are allowed to have $G\rho \subset G_I$, $G_S \subset G_I$, or both.

Gε: A set of providers that must be excluded into the network.

$Gx:=G_I \cup G\varepsilon$. Without loss of generality, we assume $G_I \cap G\varepsilon = \{\emptyset\}$.

Data $v_g$: Overall episode volume for provider group $g \in G_c$. Note that $v_g \geq 1$ for all $g \in G_c$.

$v_{g,s}$: Episode volume for provider group $g \in G_c$ at specialty level $s \in S$. If provider g does not provide specialty s, then let $v_{g,s}:=0$. Note that $\Sigma_{s \in S} v_{g,s} \leq v_g$ (the equality happens only if $v_{g,s}$ is sufficiently large). Moreover, $v_{g,s} \geq 1$ for all $g \in G_c$ and $s \in S$.

$\underline{c}_g, c_g, \overline{c}_g$: Lower bound, average, and upper bound value of the cost index for provider group $g \in G_c$.

$\underline{q}_g, q_g, \overline{q}_g$: Lower bound, average, and upper bound value of the quality index for provider group $g \in G_q$.

$m_z$: Number of members in zip code $z \in Z$.

a(g, s): The zip code of provider g with specialty s.

d(z, a(g, s)): Distance between a member zip code z and a provider-specialty's zip code a(g, s).

User-Defined Parameters $c^b$: Maximum cost for a provider group to be considered in network.

$q^b$: Minimum quality allowed for a provider group to be considered in network.

$c^*$: Maximum average cost requirement for the entire network.

$q^*$: Minimum average quality requirement the entire network.

$d^*_s$: Maximum distance that defines the member accessibility (in close proximity) to specialty s.

$m^*_s$: Minimum percentage of members who have access to specialty s in close proximity (coverage ratio).

$v^*$: Minimum percentage of the volume requirement.

$v^*_s$: Minimum percentage of the volume requirement at specialty level s.

Indicator $b_{zgs}$: Let $b_{zgs}:=1$ if $a(g, s)$ exists and $d(z, a(g, s)) \leq d^*_s$, or 0 otherwise.

Decision Variables $y_g \in \mathbb{B}$: Given provider $g \in G$, let $y_g:=1$ if g is considered in network, or 0 otherwise.

$w_{zs} \in \mathbb{B}$: Given member zip code $z \in Z$ and a specialty $s \in S_g$ with a geo-access requirement, let $w_{zs}:=1$ if members located at zip code z have an access to specialty s considered in network, or 0 otherwise.

Objective Functions

Depending on the user's preference, three different objective functions may be used for optimization.

Average cost minimization:

$$\min \frac{\sum_{g \in G_z} v_g c_g y_g}{\sum_{g \in G_z} v_g y_g}. \tag{1}$$

Average quality maximization:

$$\max \frac{\sum_{g \in G_q} v_g q_g y_g}{\sum_{g \in G_q} v_g y_g}. \tag{2}$$

Total volume maximization:

$$\max \sum_{g \in G_q} v_g y_g. \tag{3}$$

Constraints

Each provider in $G_I$ (resp. $G\varepsilon$) must be included in (resp. excluded from) network.

$$y_g = 1, \forall g \in G_I. \tag{4}$$

$$y_g = 0, \forall g \in G_\varepsilon. \tag{5}$$

Each provider group may satisfy the maximum cost index constraint to be considered in network. Depending on the user's preference, the cost index may be chosen from its lower bound value, average value, or upper bound value.

$$c_g y_g \leq c^b, \forall g \in G_c \setminus G_\chi. \tag{6}$$

Each provider group may satisfy the minimum quality index constraint to be considered in network. Depending on the user's preference, the quality index may be chosen from its lower bound value, average value, or upper bound value.

$$q_g y_g \geq q^b, \forall g \in G_q \setminus G_\chi. \tag{7}$$

The network may satisfy the minimum overall volume ratio requirement.

$$\sum_{g \in G_c} v_g y_g \geq v^* \sum_{g \in G_c} v_g. \tag{8}$$

The network may satisfy the minimum volume ratio requirement at specialty level.

$$\sum_{g \in G_c} v_{g,s} y_g \geq v^*_s \sum_{g \in G_c} v_{g,s}, \forall s \in S. \tag{9}$$

The network may satisfy the maximum average cost requirement.

$$\sum_{g \in G_c} v_g c_g y_g \leq c^* \sum_{g \in G_c} v_g c_g. \tag{10}$$

The network may satisfy the minimum average cost requirement.

$$\sum_{g \in G_c} v_g q_g y_g \geq c^* \sum_{g \in G_c} v_g q_g. \tag{11}$$

Each specialty may satisfy minimum coverage ratio.

$$\sum_{z \in Z} m_z w_{zs} \geq m^*_s \sum_{z \in Z} m_z, \forall s \in S_g. \tag{12}$$

Determine if members in each zip code may have coverage for each specialty.

$$\sum_{g \in G} b_{zgs} y_g \geq w_{zs}, \forall z \in Z, s \in S_g. \tag{13}$$

$$b_{zgs} y_g \leq b_{zgs} w_{zs}, \forall z \in Z, s \in S_g, g \in G. \tag{14}$$

1.2 Linearization of the Objective Function

The average cost objective function (1) and the average quality objective function (2) are not linear, but they both may be linearized with additional variable substitution and big-M reformulation. In the following the details for linearizing (1) are presented. (2) can be linearized in a similar manner Let $x^0 := 1/(\Sigma_{g \in G_e} v_g y_g)$ and $x_g := y_g x_0$, $\forall g \in G_c$. Moreover, let $v_{min} := \min_{g \in G_c} v_g$) Note that $v_{min} \geq 1$. Now, objective function (1) can be rewritten as $$\min \frac{\sum_{g \in G_c} c_g v_g x_g}{\sum_{g \in G_c} v_g}, \tag{15}$$

with the following additional constraints:
Make sure $x_0$ is well-defined.

$$\sum_{g \in G_c} v_g y_g \geq 1. \quad (16)$$

Variable substitution.

$$\sum_{g \in G_c} v_g x_g = \sum_{g \in G_c} v_g \quad (17)$$

Bound on z.

$$0 \leq z \leq \frac{\sum_{g \in G_c} v_g y_g}{v_{min}} \quad (18)$$

Bound on $x_g$.

$$0 \leq x_g \leq \frac{\sum_{g \in G_c} v_g y_g}{v_g} y_g. \quad (19)$$

Big-M formulation for $x_9$.

$$z - \frac{\sum_{g \in G_c} v_g}{v_{min}}(1 - y_g) \leq x_g \leq z, \forall g \in G_c. \quad (20)$$

1.3 Basic Model Formulation

Let $\tilde{y} := (x; y; z)$. The optimization model can be rewritten as $$\min \tilde{c}^T \tilde{y} + \sum_{s \in S} Q_s(\tilde{y}), \quad (21)$$

$$s.t. \quad \tilde{y} \in y,$$

where $y := \{\tilde{y}: \text{constraints } (4)-(11),(16)-(20), y_g \in \mathbb{B} \; \forall g \in G_s\}$ and $Q_s(\tilde{y}) := \max 0^T w_{\cdot s}$ s.t. constraints (12), (13), (14), $$w_{xs} \in \mathbb{B}, z \in Z, s \in S_g. \quad (22)$$

Here $\tilde{c}$ may be a column vector with proper dimension that stores the objective coefficients from (15), and define $w_{\cdot s} := w_{zs} := \{w_{zs} : \forall z \in Z\}$ is defined. Observe that this optimization model has a dual block-angular structure [4], where each block may be associated with a specific specialty s, and is linked to others with constraints (13) and (14). Each block may involve all binary variables; moreover, its dimensionality may depend on the number of zip codes and providers in constraint (14). This unavoidably may increase the model complexity as the combination of zip codes and providers may be very large in practice.

To reduce the model complexity, it is shown that, for each block the integrality of binary variable $w_{zs}$ may be relaxed and the constraint (14) may be removed safely.

1.4 Enhanced Model Formulation

Now, let $$\min \tilde{c}^T \tilde{y} + \sum_{s \in S} \tilde{Q}_s(\tilde{y}), \quad (23)$$

$$s.t. \quad \tilde{y} \in y,$$

where $\tilde{Q}_s(\tilde{y}) := \max 0^T w_{\cdot s}$ s.t. constraints (12), (13), $$0 \leq w_{zs} \leq 1. \quad (24)$$

Lemma 2.1. For any
$\tilde{y} \in y$, if $Q_s(\tilde{y})$ for all $s \in S$ are feasible, then so are $\tilde{Q}_s(\tilde{y})$
Proof. This is true since $Q_s(\tilde{y}) \subset \tilde{Q}_s(\tilde{y})$ for all $s \in S$ Lemma 2.2. For any
$\tilde{y} \in y$, for any $s \in S$ if $Q_s(\tilde{y})$ is not feasible, then either is $\tilde{Q}_s(\tilde{y})$ Proof. Given $\tilde{y} \in y$, it is assumed M y) has no feasible solution, whereas $Q_s(\tilde{y})$ has. Hence, there exists a fractional solution $w_{zs}^*$ such that $w_{zs}^* \in \mathbb{B}$ for some $z \in Z$. However, $\lceil w_{zs}^* \rceil \forall z \in Z$ also satisfies constraints (12), (13), (14), and thus is a feasible solution to $Q_s(\tilde{y})$, contradicting to the assumption. Thus the result.

Let $\tilde{y}^*$ and $w_{zs}^* \forall s \in S$, $z \in Z$ be an optimal solution of (23). The following result show may that the problem (21) and problem (23) equivalent.

Theorem 2.1. Problem (21) and problem (23) have the same optimal objective value. Moreover, if $w_{zs}^* \forall s \in S$, $z \in Z$ is an integral solution, then $y^*$ and $w_{zs}^*$ also satisfy (21). otherwise, a corresponding integral solution can be obtained by rounding any fractional component of $w_{zs}^*$ up to 1.

Proof. The first part of Theorem 2.1 is a direct result of Lemma 2.1 and Lemma 2.2, since $Q_s(\tilde{y})$ and $\tilde{Q}_s(\tilde{y})$ are both feasibility problems. For the second part, any $\lceil w_{zs}^* \rceil \forall z \in Z$ also satisfies constraints (12), (13), (14), and thus is a feasible solution to $Q_s(\tilde{y})$. This completes the proof.

Theorem 2.1 allows solving a relaxation problem with significantly fewer constraints and binary variables in each block, and thus potentially improves the model complexity and solution times.

1.5 Solving the Enhanced Model with Benders Decomposition

In this section it is shown that, problem (23) can be efficiently solved with an integer L-shaped method (or Benders decomposition). Since each recourse subproblem involves only continuous variables, the recourse function $\tilde{Q}_s(\tilde{y})$ is a piecewise linear convex function, and can be approximated with standard Benders' cuts. All subproblems $\tilde{Q}_s(\tilde{y})$ have a null objective function, and hence, only feasibility cut is required for the recourse function approximation. The generation of the feasibility cuts requires the dual unbounded ray (certificate of the primal infeasibility) of $\tilde{Q}_s(\tilde{y})$, and this process can be expensive when the dimensionality of $\tilde{Q}_s(\tilde{y})$ is large. To speed up the solution, it is demonstrated in the following that, such unbounded ray can be obtained in closed-form.

Given $\tilde{y} \in y$, rewrite $\tilde{Q}_s(\tilde{y})$ as:

$$\max 0^T w \tag{25}$$

$$\text{s.t.} \sum_{z \in Z} m_z w_{zs} \geq m_s^* \sum_{z \in Z} m_z, \tag{26}$$

$$\sum_{g \in G} b_{zgs} y_g \geq w_{zs}, \forall z \in Z, \tag{27}$$

$$0 \leq w_{zs} \leq 1. \tag{28}$$

The dual formulation of $\tilde{Q}_s(\tilde{y})$ is $$\min -m_s^* \lambda + \sum_{z \in Z} \left( \sum_{g \in G} b_{zgs} y_g \right) \pi_{zs} + \sum_s \rho_{zs} \tag{29}$$

$$\text{s.t.} \ -m_z \lambda + \pi_{zs} + \rho_{zs} \geq 0, \forall z \in Z, \tag{30}$$

$$\lambda^* := 1, \rho_{zs}^* := 0, \pi_{zs}^* := \begin{cases} m_z, & \text{if } \sum_{g \in G} b_{zgs} y_g = 0, \\ 0, & \text{otherwise,} \end{cases} \tag{31}$$

where $\lambda$, $\pi_{\cdot s}$, $\rho_{\cdot s}$, are Lagrangian multipliers corresponding to constraints (26), (27), and (28), respectively.

Now it is assumed that $\tilde{Q}_s(\tilde{y})$ is not feasible. If $\Sigma_{g \in G} b_{zgs} y_g \geq 1$ for all $z \in S$, then it is claimed our network optimization problem has no feasible solution, as coverage constraint (26) can never be satisfied. On the other hand, if $\Sigma_{g \in G} b_{zgs} y_g = 0$ for some $z^* \in Z$, then an unbounded ray may be obtained with the following:

$$\lambda^* := 1, \rho_{zs}^* := 0, \pi_{zs}^* := \begin{cases} m_z, & \text{if } \sum_{g \in G} b_{zgs} y_g = 0, \\ 0, & \text{otherwise,} \end{cases} \tag{32}$$

Observing that for any p>0, p($\lambda$*, $\pi$*$_s$, $\rho \cdot$*$_s$) always satisfies constraints (30) and (31) and the objective function value decreases asp increases, hence ($\lambda$*, $\pi \cdot$*$_s$, $\rho \cdot$*$_s$) is a valid unbounded ray.

Theorem 2.2. Given $y \in y$, assuming that $\tilde{Q}_s(y)$ is not feasible for some $s \in S$. If $\Sigma_{g \in G} b_{zgs} y_g \geq 1$ for all $z \in Z$, then optimization problem (21) has no feasible solution. Otherwise, (32) gives a dual unbounded ray for $\tilde{Q}_s(\tilde{y})$, and it can be calculated with O (|G|·|Z|) operations. As such, a valid feasibility cut is given by $$\sum_{g \in G} \sum_{z \in Z} \pi_{zs}^* b_{zgs} y_g \geq 0. \tag{33}$$

Referring to FIG. 3, there is shown a modification of the integer L-shaped method for solving model (23). In this algorithm, a branch-and-cut search tree may be developed over the integer variables in the master problem, and the Benders' cut may be generated during the search.

2. Computational Study

In this section computational results are presented. All these enhancements may be implemented in an optimization engine referred to as ndo-engine-disc, which is developed in Python 2.7. All computations are performed on 24-physical-core (48-logical-core) Intel Xeon E5-2670 2.30 GHz CPU with 128 GB RAM running Linux Red Hat 6.9; however, no parallelization was used in this computational study.

Our problem test set consists of 396 problems drawn from different product scopes. All problem data were collected from claim data, and user-defined parameters were selected carefully to align with business goals. Cost minimization (1) was chosen as the objective function for all these problems. Constraints (4)-(9), (12)-(14), and (16)-(20) are imposed into the model. PCP requirement and multi-specialty requirements are not imposed. Other parameters are summarized in Table 1.

GUROBI [1] Version 6.5 may be used for solving the underlying mixed-integer linear programs with additional customized parameter settings listed in Table 2. In our computational runs a time limit of an hour may be set for each problem in each run.

TABLE 1

Problem Profile

| Requirement | Possible Values | Selection Criteria |
|---|---|---|
| State | CO, CT, GA, IN, ME, NH, NV, NY, VA | Randomly selected |
| Product | Commercial | NA |
| LOB | PPO, HMO | Randomly selected |
| Specialty | 23 most commonly used specialties* | All selected |

1 *Ophthalmology, General Surgery, Orthopedic Surgery, Cardiology, Dermatology, Neurology, Gastroenterology, Otolaryngology, Urology, Chiropractic, Endocrinology, Family Practice, General Practice, Internal Medicine, Interventional Cardiology, Licensed Clinical Social Wrkr, Nephrology, Neurosurgery, Pediatric Medicine, Physical Medicine and Rehab, Podiatry, Pulmonary Disease.

TABLE 2

Customized parameter settings for GUROBI

| Parameter | Description | Value |
|---|---|---|
| MIPGapAbs | Absolute MIP optimality gap | 1.E-3 |
| MIPGap | Relative MIP optimality gap | 1.E-3 |
| BarHomogeneous | IPM method | 1 (HSD-IPM)* |
| PrePasses | Presolve level | 10 |
| Method | Root method | 1 (Simplex) or 2 (IPM)** |

1 *Homogeneous and self-dual interior-point method (IPM).
2 **Simplex method is used if the number of variables is less than 10000; otherwise, we used IPM.

To provide a summary of the results, we use performance profiles [5]. Consider a set A of $n_a$ algorithms, a set P of $n_p$ problems, and a performance measure $m_{a,p}$, e.g., computation time. Compare the performance on problem p by algorithm a with the best performance by any algorithm on this problem using the following performance ratio $$r_{p,a} = \frac{m_{p,a}}{m_p^*},$$

where $m_p^* := \min \{m_{p,a} | a \in A\}$. Obtain an overall assessment of the performance of the algorithm by defining the following value $$\rho_a(\tau) = \frac{1}{n_p} \text{cardinality}\{p \in P \mid r_{p,a} \leq \tau\}.$$

This may represent the probability for algorithm a that the performance ratio $r_{p,a}$ is within a factor $\tau$ of the best possible ratio. The function $p_a(\cdot)$ represents the distribution function for the performance ratio.

2.1 Performance of the Network Solution

Present and discuss computational results on the test problems. Benchmark the effectiveness of the proposed optimization model by comparing its optimal objective value with that from a line model, which maximizes the total volume (3) and is subjected to the simple variable bounded constraints (4)-(7). As such, an optimal solution can be obtained without explicit optimization but simply filtering out irrelevant or constraint-violated providers. Note this optimal solution also satisfy constraints (8)-(9) and (12)-(14). More importantly, emphasize that this baseline solution is used by business users nowadays to create a network solution.

Table 3 may summarize the computational results on 396 problems. Column "State" gives the product scopes associated with a particular state. Columns "Baseline value" and "Cost-minimized value" respectively provide the overall objective values of the baseline model and the proposed optimization model. Column "Improvement" shows the overall improvements in percentage. "AVG" in the last row of the table provides the arithmetic means.

Observe that the proposed average cost of the cost-minimization model consistently outperforms that of the baseline model across nine different states. Specifically, the improvement ranges from 10.19% (VA problems) to 25.34% (NY problems), with an overall improvement of 16.08%. This is a very significant cost-saving in practice and it clearly demonstrates the effectiveness of our proposed optimization model. Finally, note that NY problems in general are much larger than others, and thus the cost-savings are even more significant.

TABLE 3

Computational comparisons of cost-minimized value and baseline value

| State | Baseline value | Cost-minimized value | Improvement (%) |
|---|---|---|---|
| CO | 1.1068 | 0.9627 | 14.97 |
| CT | 1.0868 | 0.9436 | 15.18 |
| GA | 1.1044 | 0.9412 | 17.34 |
| IN | 1.1064 | 0.9473 | 16.82 |
| ME | 1.0987 | 0.9772 | 12.43 |
| NH | 1.1210 | 0.9774 | 14.69 |
| NV | 1.1052 | 0.9387 | 17.74 |
| NY | 1.1129 | 0.8879 | 25.34 |
| VA | 1.0740 | 0.9747 | 10.19 |
| AVG | 1.1018 | 0.9501 | 16.08 |

2.2 Performance of the Enhanced Model

The solution times for solving basic optimization model (21) with that for the enhanced optimization model (23) are compared. Table (4) summarizes the computational results on 396 problems. Column "State" gives the product associated with a particular state. Columns "Basic model' and "Enhanced model' respectively provide the overall solution times in seconds required for solving the basic optimization model and the enhanced optimization model. Column "Improvement" shows the overall improvements in percentage. "AVG" in the last row of the table provides the arithmetic means.

Observe that the enhanced optimization model improves the solution times dramatically, with the improvement ranges from 300% to almost 4,000%. The overall improvement is 1,388%. Recall that the purpose of NDO is to provide an online solution platform that allows users to create a network solution within a 10 minutes of time-limit. The basic model failed to satisfy these requirements on solving most IN, NY, and CT problems. In comparison, the enhanced model successfully solves all problems within the time-limit. In average, the basic model requires 7 minutes of computations whereas the enhanced model needs only 35 seconds. This clearly demonstrates the effectiveness of the enhanced model.

Referring now to Table 4, there is shown the performance profiles comparing solution time performances of the basic model and the enhanced model.

TABLE 4

Computational comparisons of basic optimization model and enhanced optimization model

| State | Basic model | Enhanced model | Improvement (%) |
|---|---|---|---|
| CO | 200.70 | 7.98 | 2414.75 |
| CT | 591.15 | 14.74 | 3911.08 |
| GA | 303.35 | 24.72 | 1126.97 |
| IN | 724.18 | 95.20 | 660.69 |
| ME | 24.08 | 2.62 | 818.55 |
| NH | 21.99 | 2.68 | 720.24 |
| NV | 10.65 | 2.67 | 299.60 |
| NY | 1767.11 | 151.01 | 1070.22 |
| VA | 220.62 | 19.66 | 1022.34 |
| AVG | 429.32 | 35.70 | 1338.27 |

Concluding Remarks

In this application, an optimization model for the Network Design and Optimization project is described. The model solution improves the cost-saving target by 16% on average, when compared with a baseline solution used nowadays. Moreover, additional computational enhancements that significantly speedup the solution time by almost 14 folds on average are developed. Computational results on a large number of problems drawn from different product scopes using real life data clearly demonstrate the efficiency and effectiveness of the proposed solution.

EXAMPLES

Goal: Given N providers, each with its own cost and volume, the goal is to select K providers among them such that the average cost of the selected providers (called network) is minimized. The business requirements must be satisfied.

Model data (see page 4, Data Section)

$c_g$ (g=1, 2, . . . , N): cost of provider g.

$v_g$ (g=1, 2, . . . , N): volume of provider g.

Decision variables (see page 5, Decision variables Section)

$y_g$ (g=1, 2, . . . , N): $y_g$=1 if provider g is selected, 0 o/w.

Average cost (see page 6, eq (1))

$\Sigma c_g v_g y_g / \Sigma v_g y_g$: Total cost weighted by volume/Total volume Volume Constraint (see page 7, eq (9))

$\Sigma v_g y_g \geq v^* \Sigma v_g$: Provided volume>=Required volume, where v is given in %.

Example 1

Given three candidate providers (N=3). Our goal is to select some (or all) of them such that the average cost is minimized, the minimum volume ($v^*$=4/6) can be satisfied.

|  | Provider | | |
| --- | --- | --- | --- |
|  | 1 | 2 | 3 |
| Cost | 1 | 3 | 3 |
| Volume | 2 | 1 | 3 |
| Weighted cost | 1 * 2 = 2 | 3 * 1 = 3 | 3 * 3 = 9 |

All possible solutions for example 1

|  | Selected Providers | | | | | | | |
| --- | --- | --- | --- | --- | --- | --- | --- | --- |
|  | 1 | 2 | 3 | 1, 2 | 1, 3 | 2, 3 | 1, 2, 3 | None |
| Total provided volume | 2 | 1 | 3 | 3 | 5 | 4 | 6 | 0 |
| Total provided volume/Total volume | 2/6 | 1/6 | 3/6 | 3/6 | 5/6 | 4/6 | 6/6 | 0 |
| Total weighted cost | 2 | 3 | 9 | 5 | 11 | 12 | 14 | 0 |
| Average cost | 1 | 3 | 3 | 5/3 | 11/5 | 3 | 14/6 | NA |

Recall our minimum volume requirement $v^*=4/6$. From row 2, only the following three networks can provide sufficient volume: (1,3), (2,3), (1,2,3)
From row 4, it is shown that network (1,3) gives the best average cost (11/5).
A network problem with 3 providers and 1 volume constraint may be successfully solved in this way.

Model in Example 1

Model
Objective: $\Sigma c_g v_g y_g / \Sigma v_g y_g \Rightarrow = (2y_1+3y_2+9y_3)/(2y_1+1y_2+3y_3)$
Volume requirement: $\Sigma v_g y_g \geq v^* \Sigma v_g \Rightarrow (2y_1+3y_2+9y_3) \geq (4/6)(2+1+3)$
Solution Verification
Suppose providers 1 and 3 are selected, then, $y\_1=y\_3=1$, and $y\_2=0$.
The objective value (average cost)$=(2+9)/(2+3)=11/5$
The provided volume$=(2+3)=5\geq(4/6)(2+1+3)=4$.
For network with 3 providers to pick, the total possibilities are $2^3=8$. What about for a network with 1,000 providers? The total possibilities are $2^{1000}=(2^{10})^{100} \sim 10000^{100}$
Model 2: Making Model 1 More Practical
Model Data
$m_z$ (z=1,2, . . . , M): Total members located at zone z (see page 5, Data Section).
S: Possible specialties (see page 3, Data Section).
Decision variables (see page 5, Decision variables Section)
$w_{zs}$(z=1, 2, . . . , s=1, 2, . . . ): $w_{zs}=1$ if members at zone z has access to specialty s, or 0 o/w.
Coverage ratio requirement (see page 8, eq (15))
$\Sigma m_z w_{zs} \geq m_s^* \Sigma m_z$: For specialty s, total covered members>=Total required covered members, where $m_s^*$ is given in %.
Impose some relationships between $y_g$ and $w_{zs}$.
Indicator (see page 5, Indicator Section).
$b_{zgs}=1$ means a provider g can provide specialty s for members located at z.
$b_{zgs}$ are given.
Linking $y_g$ and $w_{zs}$ (see page 8, eq (16) and (17))
$\Sigma b_{zgs} y_g \geq w_{zs}$: A member at zone z will not have access to specialty s, unless at least a provider g being able to provide specialty s for members at zone z is selected.

$b_{zgs} y_g \leq b_{zgs} w_{zs}$: If provider g is picked, then all covered members at z must have access to specialty provided s. Note: This is done through indicator $b_{zgs}$.
Given three candidate providers (g=1, 2, 3) as usual. Only one specialty (s=1). Three zone (z=a, b, c).

|  | Zone | | |
| --- | --- | --- | --- |
|  | a | b | c |
| Members ($m_z$) | 1 | 2 | 3 |
| Provider 1: $b_{z,g=1,s=1}$ | 1 | 0 | 0 |
| Provider 2: $b_{z,g=2,s=1}$ | 1 | 1 | 0 |
| Provider 3: $b_{z,g=3,s=1}$ | 1 | 0 | 1 |

Provider 1 can provide service for zone a. Provider 2 can provide service for member at zone a and b. Provider 3 can provide service for members at zone a and c.
Objective and volume, as defined in example 1. Our goal is to select some (or all) of them such that average cost is minimized, the minimum volume ($v^*=4/6$) can be satisfied. The minimum covered ratio ($m_s^*=5/6$) can be satisfied.
Consider the following three networks: (1,3), (2,3), (1,2,3)

|  | Selected Providers | | |
| --- | --- | --- | --- |
|  | 1, 3 | 2, 3 | 1, 2, 3 |
| Covered zone | a, c | a, b, c | a, b, c |
| Total covered members | 4 | 6 | 6 |
| Total covered members/Total members | 4/6 | 6/6 | 6/6 |
| Average cost | 11/5 | 3 | 14/6 |

Objective: $\Sigma c_g v_g y_g / \Sigma v_g y_g \Rightarrow = (2y_1+3y_2+9y_3)/(2y_1+1y_2+3y_3)$
Volume: $\Sigma v_g y_g \geq v^* \in v_g = (2y_1+3y_2+9y_3) \geq (4/6)(2+1+3)$
Coverage: $\Sigma m_z w_{zs} \geq m_s^* \Sigma m_z \Rightarrow (1w_{as}+2w_{bs}+3w_{cs}) \geq (5/6)(1+2+3)$
Linking: $\Sigma b_{zgs} y_g \geq w_{zs}$
For z=a, $(y_1+y_2+y_3) \geq w_{a,1}$. For z=b, $(y_2) \geq w_{b,1}$. For z=c, $(y_3) \geq w_{c,1}$.
Linking: $b_{zgs} y_g \leq b_{zgs} w_{zs}$:
For z=a, g=1, $y_1 \leq w_{a,1}$. For z=b, g=1, $y_1 \leq w_{b,1}=1$. For z=c, g=1, $y_1 \leq w_{c,1}=1$. And so forth.
Solution Verification
Suppose providers 1, 2, 3 are selected, then, $y_1=y_2=y_3=1$.
Suppose members in every zone can be covered, then $w_{a1}=w_{b1}=c_{c1}=1$.
The objective value (average cost)$=(2+3+9)/(2+1+3)=14/6$
The provided volume$=(2+3+1)=6\geq(4/6)(2+1+3)=4$.
The provided coverage$=(1+2+3)\geq(5/6)(1+2+3)$
Linking: $\Sigma b_{zgs} y_g \geq w_{zs}$
For z=a, g=1, $1 \leq w_{a,1}=1$. For z=b, g=1, $0 \leq w_{b,1}=1$. For z=c, g=1, $y_1 \leq w_{c,1}=1$. And so forth.
Linking: $b_{zgs} y_g \leq b_{zgs} w_{zs}$:
For z=a, g=1, $y_1=1 \leq w_{a,1}=1$. For z=b, g=1, $y_1=1 \leq w_{b,1}=1$. For z=c, g=1, $y_1=1 \leq w_{c,1}=1$.
And so forth, Complexity of Example 2

3 providers to pick ($y_g$), and 3 associated coverage variable ($w_{zs}$) are available.
The total possibilities are $2^{(3+3)}=64$.
A practical model may involve 1000+ providers, 100+ zones, and 75+ specialties.

Optimization Algorithm

Advanced optimization algorithm has internal mechanisms that prevents from exploring the whole solution space (full enumeration), for example, if $y_3=0$, then $wa1=w_{b1}=w_{c1}=0$. (called constraint propagation).

Its complexity in general depends on number of variables and constraints, and the variable type (continuous/discrete; in our case, they are all discrete).

Discrete variable screws up the complexity, and makes problem strongly NP hard.

Our model is very difficult to solve due to large number of discrete variables and constrains.

What if, the integrality requirements are relaxed and some constraints are removed, without compromising the solution quality as a bid.

Specifically, the integrality requirements of $w_{zs}$, and linking constraint: $b_{zgs}y_g \le b_{zgs}w_{zs}$ (for all z, g, s) can be removed safely.

The worst case complexity can be cut down from $O(2^{N+ZS})$ to $O(2^N)$, where Z is the number of zones, N is the number of providers, and S is the number of specialties, and usually $ZS \gg N$.

Moreover, at most $O(ZNS)$ constraints can be dropped safely.

Specific Model Structure

Figure 5A:
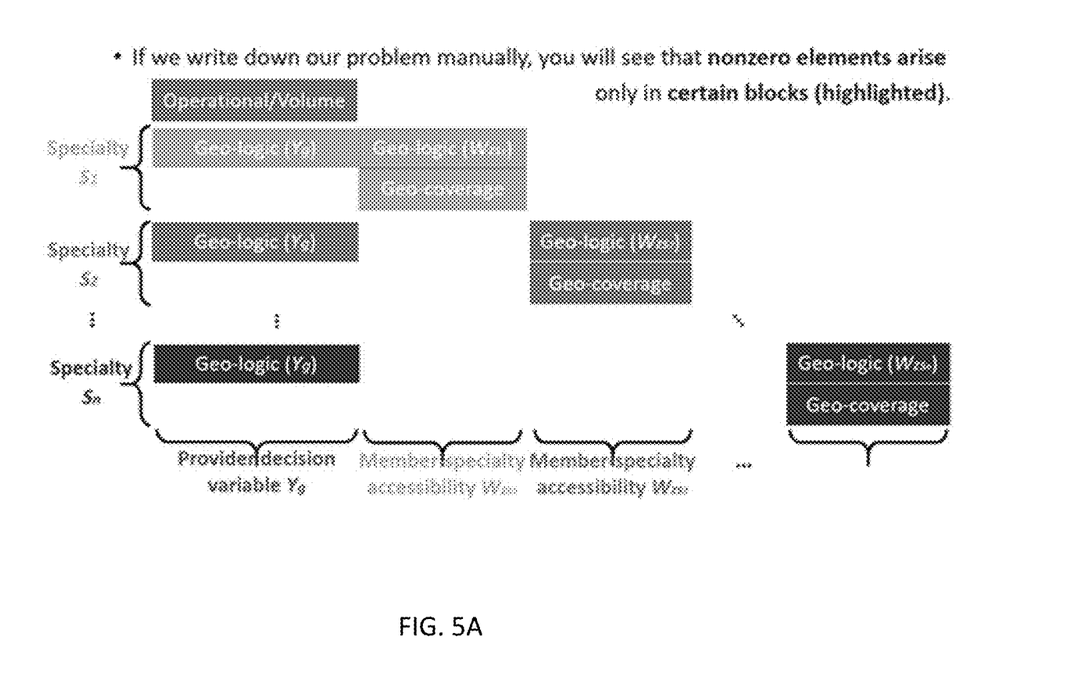
FIG. 5A is an exemplary illustration of network optimization, according to at least one aspect of the present invention.

Referring now to FIG. 5A, there is shown an exemplary embodiment of the present invention. If the problem is written down manually, the nonzero elements will only arise in only certain blocks.

Figure 5B:
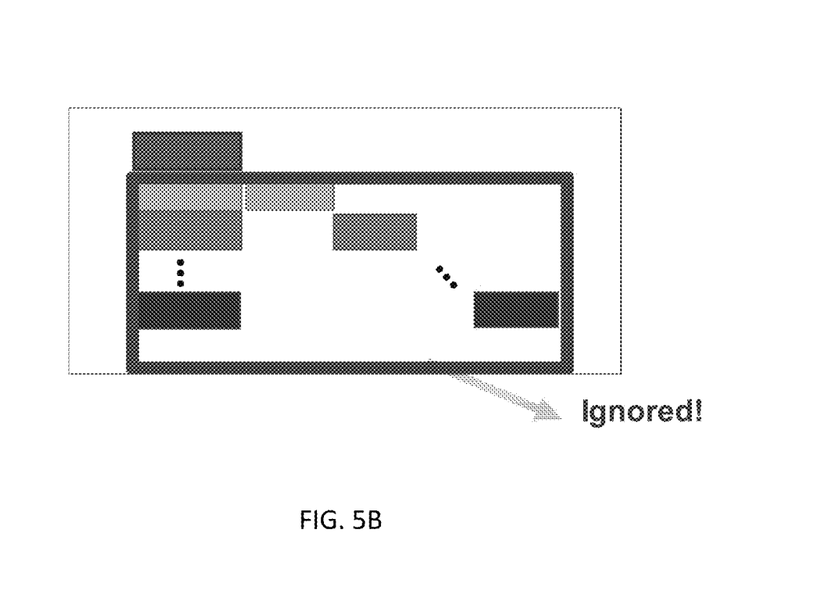
FIG. 5B is an exemplary illustration of network optimization, according to at least one aspect of the present invention.

Referring now to FIG. 5B, there is shown an exemplary embodiment of the present invention. A decomposition algorithm called Benders decomposition can benefit from this structure. Conceptually, it may only consider the upper-left block of constraints, as shown in FIG. 5B, and ignore the rest first. The algorithm generates the valid constraints that can represent the ignored structure on the fly. Generations of this valid constraints, however, are not trivial. In most cases, it may require $w_{zs}$ to be continuous.

The integrality requirement of $w_{zs}$ can be relaxed.

In one embodiment, it has been shown that the problem structure can be significantly simplified without compromising the solution quality as a bid.

In one embodiment, it has been shown that the simplified model structure can be solved with an efficient decomposition algorithm.

Computational experiments on a large number of cases demonstrate that, our proposed method speeds up the solution time 14 folds. In particular, several cases failed to solve originally can be now solved with this new approach.

This solution platform can also perform sensitivity analysis (what-if analysis) that further provides solution analytics to profile the robustness of the constructed network solution. For example, if 5% of cost-saving is sacrificed, how much network coverage can further be improved?

The solution platform can leverage providers with incomplete input data to improve the model feasibility. Specifically, if all providers with complete input data are not sufficient to construct a valid network solution, the solution platform may further include providers with incomplete data to explore a feasible network solution.

If a valid network solution still cannot be constructed, the solution platform will report the reason that results in the model infeasibility, with hope that such information helps users modifying their input easily.

Figure 6:
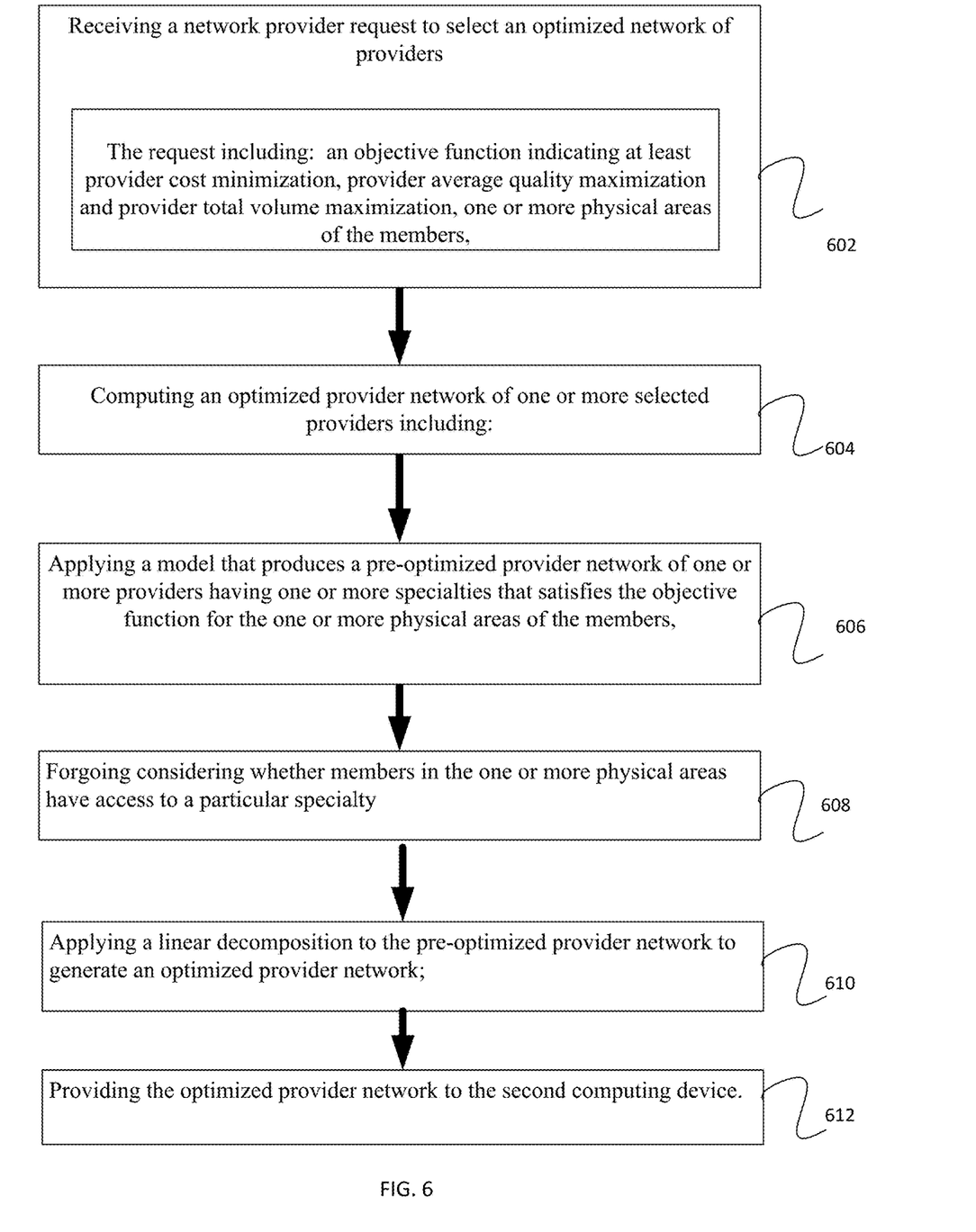
FIG. 6 is an exemplary illustration of a flow chart for recommending one or more providers to a user according to at least one aspect of the present invention.

Referring to FIG. 6, there is shown a flow chart in accordance with an exemplary embodiment of the present invention. In one embodiment, there is a computer-implemented method for selecting one or more providers (e.g., providers 202 shown in FIG. 2) having one or more specialties (e.g., Ophthalmology, General Surgery, Orthopedic Surgery, Cardiology, Dermatology, Cardiology, etc.) for a network available to members while satisfying one or more constraints (e.g., constraints, (6)-(14) defined above).

In one embodiment, the method comprises, at a first computing device: receiving 602, from a second computing device separate and distinct from the first computer, a network provider request to select an optimized network of providers (e.g., providers 204 in FIG. 2). In one embodiment, the request includes: a desired objective including at least one of provider cost minimization (e.g., average cost minimization equation, (1)), provider average quality maximization (e.g., average quality maximization equation, (2)) and provider total volume maximization (e.g., provider total volume maximization (3)), one or more geographical designations (e.g., d(z, a(g, s)): Distance between a member zip code z and a provider-specialty's zip code a(g, s)).

In one embodiment, the method comprises, at a first computing device: computing 604 an optimized provider network (e.g., narrow network 204) of one or more selected providers. Computing 604 an optimized provider network may include: applying 606 a model that produces a non-optimized provider network (that satisfies enhanced model formulation equation 23) of one or more providers having one or more specialties that satisfies the desired objective for the one or more geographical designations of the members without consideration of the availability in the geographical designation of one or more providers having one or more specialties.

In one embodiment, the method comprises, at a first computing device: applying 608 a linear decomposition (e.g., equations 25-28 and/or equations 29-31) to the pre-optimized provider network to generate an optimized provider network.

In one embodiment, the method comprises, at a first computing device: providing 610 the optimized provider network to the second computing device.

In one embodiment, without consideration of the availability in the geographical designation (e.g., d(z, a(g, s)): distance between a member zip code z and a provider-specialty's zip code a(g, s)) of one or more providers (e.g., providers 202 shown in FIG. 2), having one or more specialties includes forgoing considering whether a ratio of total members in a particular geographical designation having access to a particular specialty (e.g., cardiology) is greater than a member coverage ratio (e.g., as specified in constraint equation (12)) threshold.

In one embodiment, without consideration of the availability in the geographical designation (e.g., d(z, a(g, s)): Distance between a member zip code z and a provider-specialty's zip code a(g, s)) of one or more providers having one or more specialties includes forgoing considering whether a single member in each of the geographical designations will have access to each of the particular specialties.

In one embodiment, without consideration of the availability in the geographical designation (e.g., d(z, a(g, s)): Distance between a member zip code z and a provider-specialty's zip code a(g, s)) of one or more providers having one or more specialties includes for each particular geographical designation, each particular provider and/or each particular provider specialty, forgoing considering whether all members in the particular geographical designation have access to the particular provider specialty offered by the particular provider (e.g., as specified in constraint equation (13)).

In one embodiment, of the average cost (e.g., average cost equation (1)) of the selected providers (e.g., providers 202 in FIG. 2) is less than a predetermined provider cost threshold (e.g., as specified in constraint equation (14)).

In one embodiment, the average volume of the patients seen by the selected providers is greater than a predetermined provider volume threshold.

The average quality (e.g., average quality maximization, equation (2)) of the selected providers is greater than a predetermined provider quality threshold.

In one embodiment, the linear decomposition (e.g., linearization of the objective function (15)) is Benders decomposition (e.g., Benders decomposition further explained in equations (25)-(28)).

In one embodiment, the model that produces a non-optimized provider network is min $\tilde{c}^T \tilde{y} + \Sigma_{s \in S} \tilde{Q}_s(\tilde{y})$, s.t. $\tilde{y} \in y$, where $\tilde{Q}_s(\tilde{y}) := \max 0^T \tilde{w}_s$, s.t. $\tilde{w}_s \in W$, $0 \leq w_{zs} \leq 1, \forall z$, wherein:

$\tilde{c}$ is a vector of the objective coefficients, $\tilde{y}$ is a vector of the binary variables that provide the network solution, e.g., a provider is included or not, y represents the feasible set for $\tilde{y}$, including business requirements such as product scope, specialty required, minimum retained volume, and cost/quality baseline, S represents the set of specialties, $\tilde{Q}_s(\tilde{y})$ is a recourse subproblem that represents the coverage ratio requirement for each specialty $s \in S$, $w_{zs}$ is a vector of decision variables that determines if members located at z have an access to specialty s considered in network, W represents the feasible set for $\tilde{w}$. Specifically, W addresses minimum coverage ratio from the business requirement, and determines if members in each zip code may have coverage for each specialty. In some embodiments, $w_{zs}$ was originally formulated as a binary decision variable, but $w_{zs}$'s integrality requirement can be relaxed safely without comprising the solution quality. In some embodiments, $w_{zs}$ is rounded to an integer number in the end of solution process to ensure the integrality and feasibility of the network solution. In some embodiments, such rounded $w_{zs}$ solution has been shown to be the optimality solution to the original network problem, i.e., without integrality relaxation.

In a numerical experiment, relaxing the integrality requirement of $w_{zs}$ can speed up the solution time by almost 14 folds on average.

In at least one embodiment, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention, different components as opposed to those specifically mentioned may perform at least some of the features described herein, and features of the disclosed embodiments may be combined. As used herein, the terms "about" and "approximately" may refer to + or −10% of the value referenced. For example, "about 9" is understood to encompass 8.2 and 9.9.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

It will be understood that, although the terms "first," "second," etc. are sometimes used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the "first element" are renamed consistently and all occurrences of the second element are renamed consistently. The first element and the second element are both elements, but they are not the same element.

As used herein, the term "if" may be, optionally, construed to mean "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

We claim:

1. A computer-implemented method for selecting one or more providers having one or more specialties for a network available to members while satisfying one or more constraints, the method comprising:
    at a first computing device:
        receiving, from a second computing device separate and distinct from the first computer, a network provider request to select an optimized network of providers, the request including:
            a desired objective including at least one of provider cost minimization, provider average quality maximization and provider total volume maximization, one or more geographical designations;
        computing an optimized provider network of one or more selected providers including:
            applying a computational model having a dual block angular structure that produces a pre-optimized provider network of a plurality of providers having one or more specialties that satisfies the desired objective for the one or more geographical designations of the members without consideration of the availability in the geographical designation of the plurality of providers having one or more specialties, wherein the pre-optimized provider-network includes mixed-integer data variables and binary data variables, and
            applying a linear decomposition to the pre-optimized provider network including mixed-integer data variables and binary data variables to generate an optimized provider network to reduce overall computational time as compared to a brute-force optimization solution; and
        providing the optimized provider network to the second computing device,
    wherein the model that produces a non-optimized provider network is min $\tilde{c}^T\tilde{y}+\Sigma_{s\in S}\tilde{Q}_s(\tilde{y})$, s.t. $\tilde{y} \in y$, where $\tilde{Q}_s(\tilde{y}):=\max 0^T w_{\cdot s}$, s.t. $w_{\cdot s} \in W$, $0 \le w_{zs} \le 1, \forall z$, wherein:
$\tilde{c}$ is a vector of objective coefficients,
$\tilde{y}$ is a vector of binary variables used to provide a non-optimized provider network,
y represents a feasible set for $\tilde{y}$,
S represents a set of specialties,
$\tilde{Q}_s(\tilde{y})$ is a recourse subproblem that represents the coverage ratio requirement for each specialty, $w_{zs}$ is a vector of decision variables that determines if members located at one of the geographical designations have an access to specialty s considered in network,
W represents the feasible set for $\tilde{w}$,
z is the one or more geographical designations.

2. The method of claim 1, wherein without consideration of the availability in the geographical designation of the plurality of providers having one or more specialties includes refraining from considering whether a ratio of total members in a particular geographical designation have access to a particular specialty is greater than a member coverage ratio threshold.

3. The method of claim 2, wherein without consideration of the availability in the geographical designation of the plurality of providers having one or more specialties includes refraining from considering whether a single member in each of the geographical designations will have access to each of the particular specialties.

4. The method of claim 3, wherein without consideration of the availability in the geographical designation of the plurality of providers having one or more specialties includes for each particular geographical designation, each particular provider and/or each particular provider specialty, refraining from considering whether all members in the particular geographical designation have access to the particular provider specialty offered by the particular provider.

5. The method of claim 1, wherein the average cost of the selected providers is less than a predetermined provider cost threshold.

6. The method of claim 1, wherein the average volume of the patients seen by the selected providers is greater than a predetermined provider volume threshold.

7. The method of claim 1, wherein the average quality of the selected providers is greater than a predetermined provider quality threshold.

8. The method of claim 1, wherein the linear decomposition is Benders decomposition.

9. A system comprising:
    one or more memory units each operable to store at least one program; and
    at least one processor communicatively coupled to the one or more memory units, in which the at least one program, when executed by the at least one processor, causes the at least one processor to perform the operations of:
    at a first computing device:
        receiving, from a second computing device separate and distinct from the first computer, a network provider request to select an optimized network of providers, the request including:
            a desired objective including at least one of provider cost minimization, provider average quality maximization and provider total volume maximization, one or more geographical designations;
        computing an optimized provider network of one or more selected providers including:
            applying a computational model having a dual block angular structure that produces a pre-optimized provider network of a plurality of providers having one or more specialties that satisfies the desired objective for the one or more geographical designations of the members without consideration of the availability in the geographical designation of the providers having one or more specialties, wherein the pre-optimized provider-network includes mixed-integer data variables and binary data variables, and applying a linear decomposition to the pre-optimized provider network including mixed-integer data variables and binary data variables to generate an optimized provider network to reduce computational processing time to reduce overall computational time as compared to a brute-force optimization solution; and providing the optimized provider network to the second computing device, wherein the model that produces a non-optimized provider network is min $\tilde{c}^T\tilde{y} + \Sigma_{s\in S}\tilde{Q}_s(\tilde{y})$, s.t. $\tilde{y} \in y$, where $\tilde{Q}_s(\tilde{y}) := \max 0^T w_{\cdot s}$, s.t. $w_{\cdot s} \in W$, $0 \leq w_{zs} \leq 1, \forall z$, wherein:

$\tilde{c}$ is a vector of objective coefficients, $\tilde{y}$ is a vector of binary variables used to provide a non-optimized provider network, y represents a feasible set for $\tilde{y}$, S represents a set of specialties, $\tilde{Q}_s(\tilde{y})$ is a recourse subproblem that represents the coverage ratio requirement for each specialty, $w_{zs}$ is a vector of decision variables that determines if members located at one of the geographical designations have an access to specialty s considered in network, W represents the feasible set for $\tilde{w}$, z is the one or more geographical designations.

* * * * *